Jan. 25, 1966  G. H. PORATH  3,231,319
PRECISION SLIDE
Filed Dec. 13, 1962  4 Sheets-Sheet 3
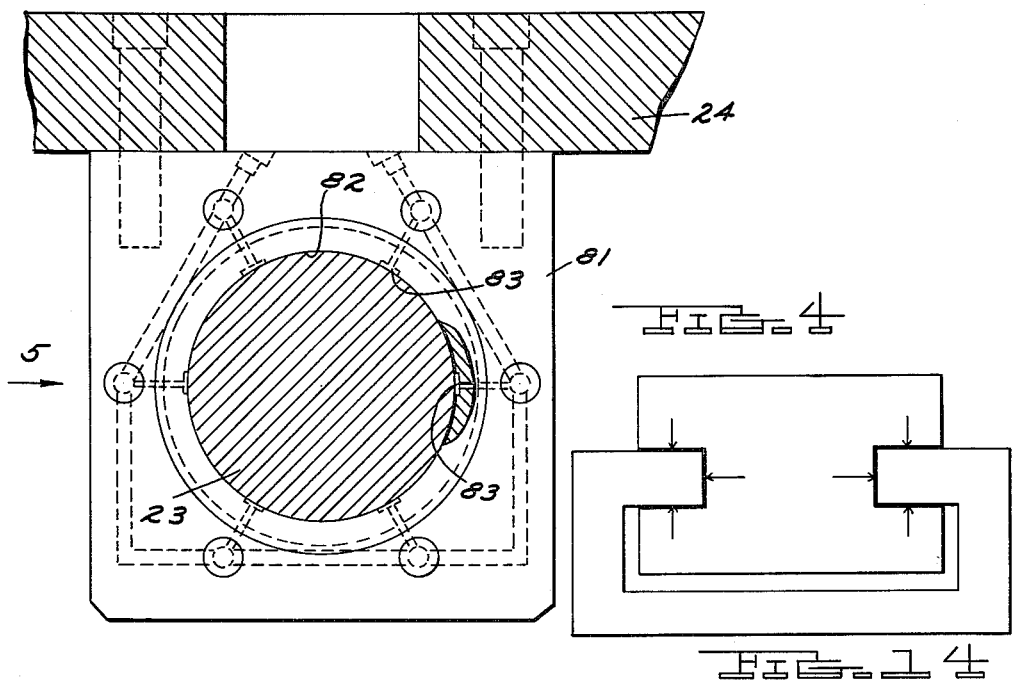
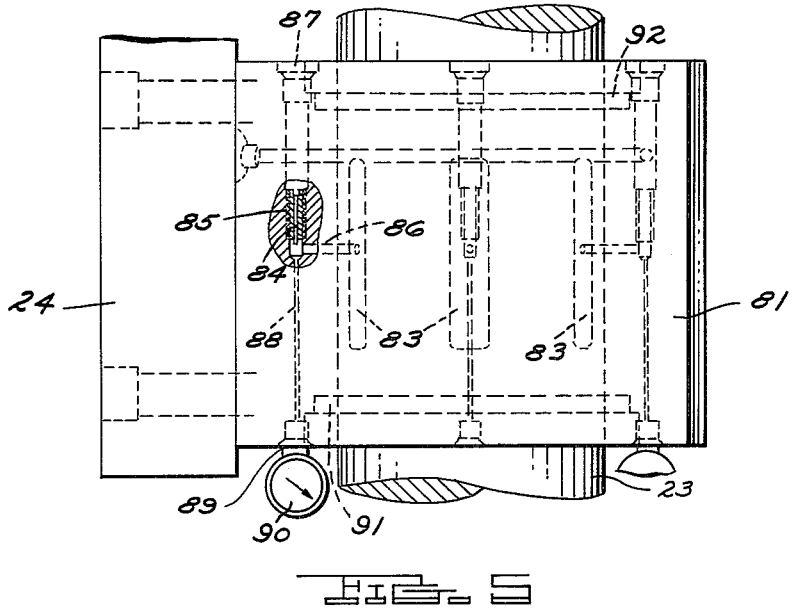
INVENTOR.
GORDON H. PORATH
BY
Barnes, Kisselle, Raisch & Choate
ATTORNEYS

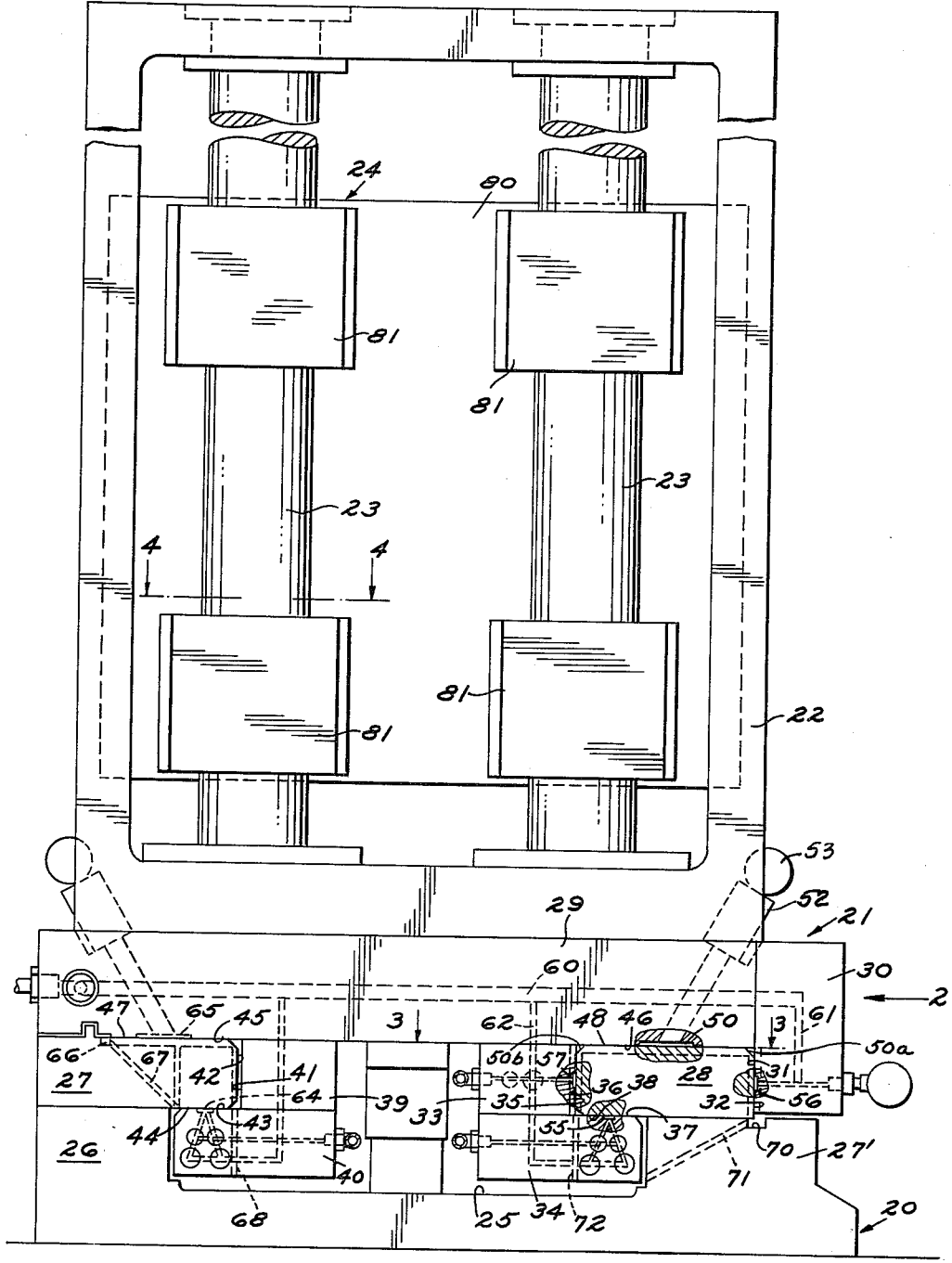

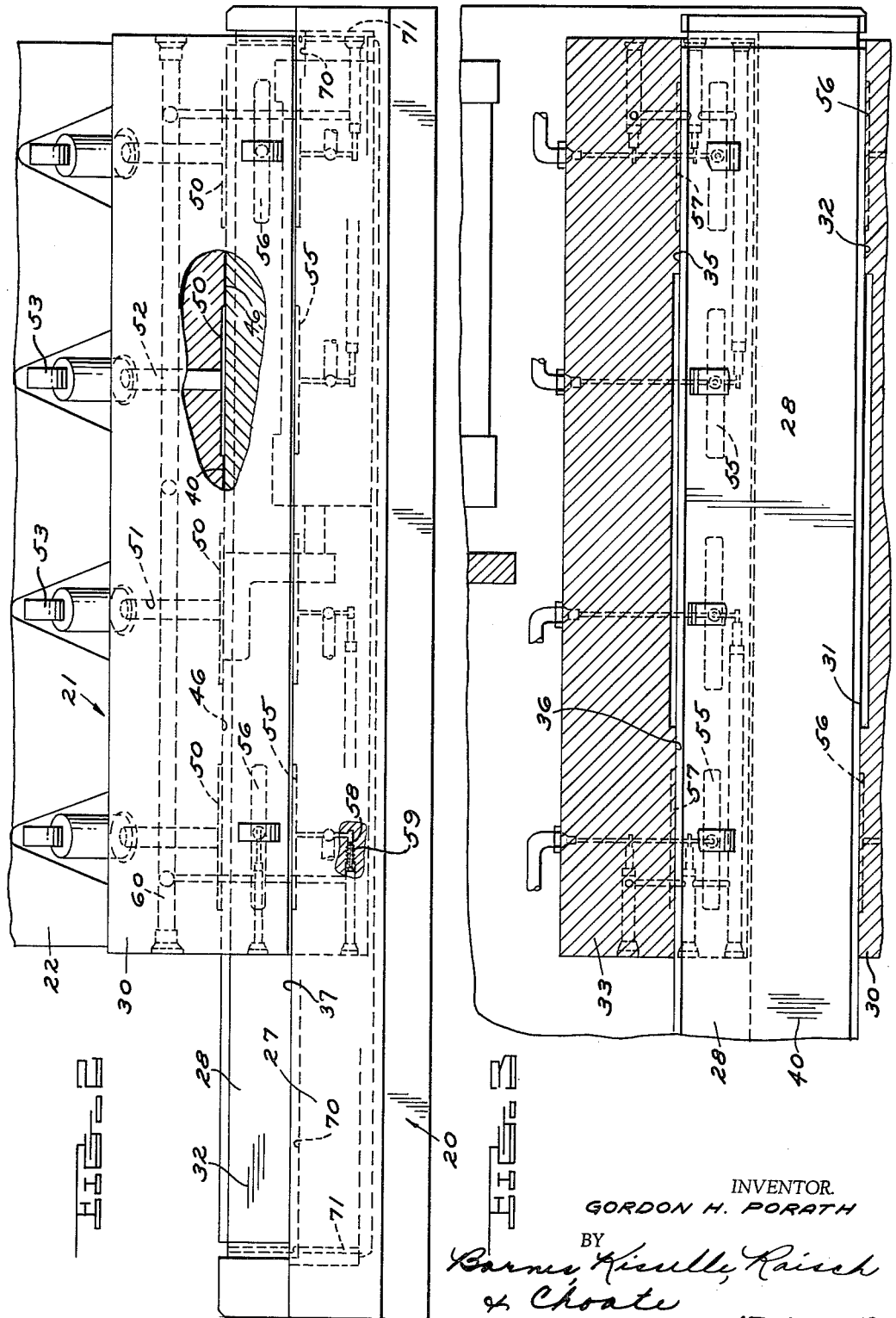

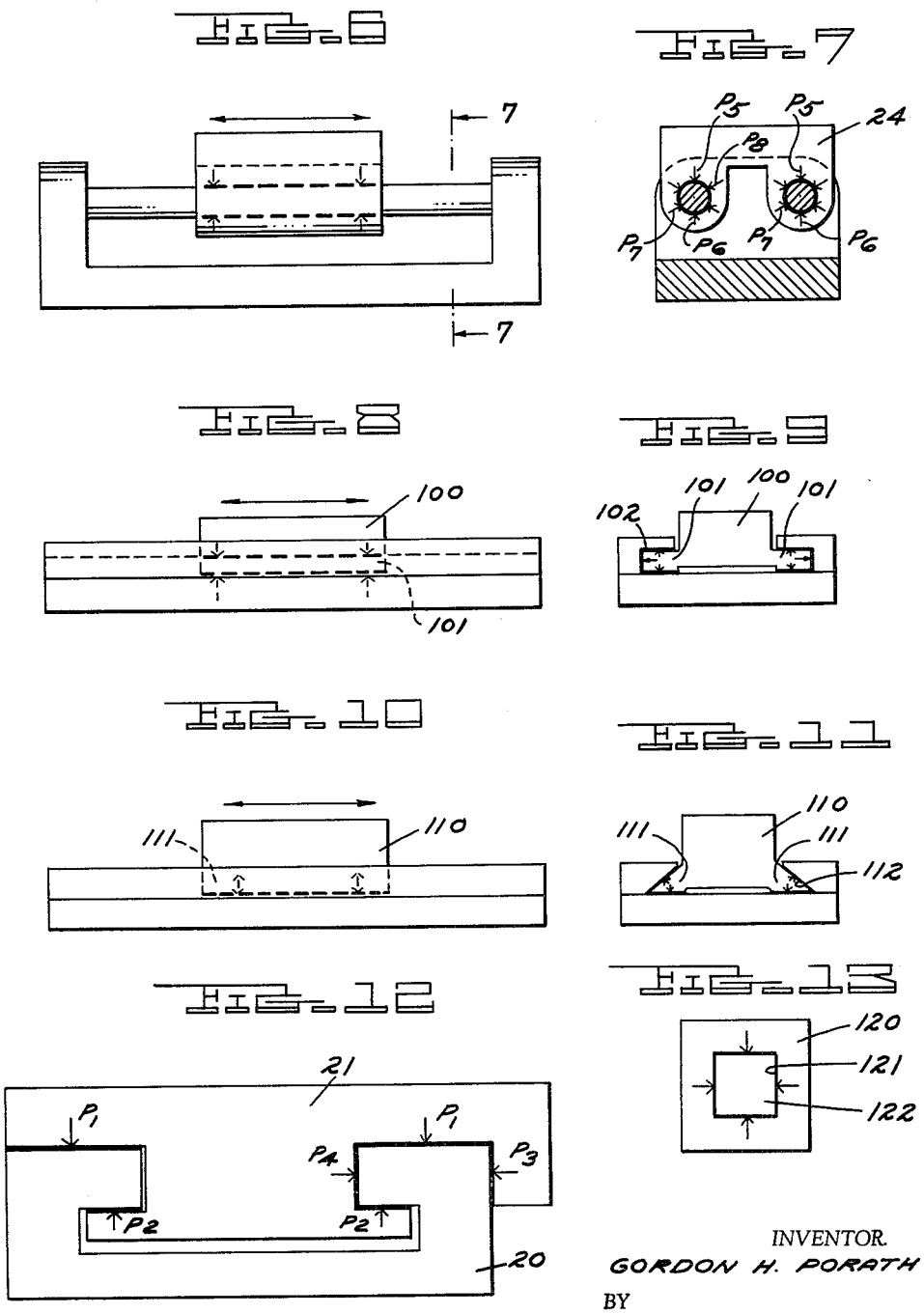

United States Patent Office 3,231,319
Patented Jan. 25, 1966

3,231,319
PRECISION SLIDE
Gordon H. Porath, 6101 Concord, Detroit, Mich.
Filed Dec. 13, 1962, Ser. No. 244,349
4 Claims. (Cl. 308—5)

This invention relates to precision slides for use on instrumentation gauges and machine tools.

In making or checking the accuracy of instruments or machine parts, it is necessary to move a slide longitudinally with great accuracy. It is conventional in such slides to utilize solid bearings wherein there is direct metal-to-metal contact or roller bearings which are made to move between the sliding surfaces. In any of these types of slides, considerable friction is encountered because of the metal-to-metal contact. This friction not only makes the slide difficult to move in predetermined small distances but, in addition, results in wear which, in due course, makes the slide operate loosely on its base so that the accuracy is completely lost. It has been suggested that pressurized lubrication be utilized to minimize friction in slides but such lubrication does not provide any compensation for varying loads or inaccurracies in the slide surfaces.

It is an object of this invention to provide a precision slide construction which has accuracies many times greater than heretofore obtained in instrumentation, gauges or machine tool slides.

It is a further object of the invention to provide such a slide in which sliding metal-to-metal friction is completely eliminated and, therefore, the slide has substantially unlimited life.

It is a further object of the invention to provide such a slide which utilizes pressurized liquid from an external source as a loading supporting medium between the slide and the base.

It is a further object of the invention to provide such a slide which can be used without loss of accuracy on both heavy and light load supporting conditions.

It is a further object of the invention to provide such a slide which is smooth and vibration free.

It is a further object of the invention to provide such a slide wherein the slide can be made of a material having a low coefficient of heat expansion and thereby further increase the accuracy of the slide.

It is a further object of the invention to provide such a slide wherein inaccuracies in machining of the parts are entirely compensated for.

It is a further object of the invention to provide such a slide which requires less power to move the slide because sliding metal-to-metal friction is entirely eliminated.

Basically, the precision slide embodying the invention comprises a base member and a slide which is adapted to be moved longitudinally along the base. The slide has surfaces thereof, which are complementary to the surfaces on the base, formed with longitudinally spaced pressure pads. An orifice is associated with each pressure pad and liquid under pressure is supplied to each orifice. The relative dimensions of the base member and slide are such that a pressurized film of liquid flows continuously between the surfaces through the pressure pads so that the forces on the pad are balanced by pressure in the pads providing a permanent separation of the surfaces throughout the movement of the slide member longitudinally of the base member. The pads are so positioned that the slide is stabilized laterally in all directions with respect to the line of movement.

In the drawings:

FIG. 1 is an elevational view of an apparatus embodying the invention.

FIG. 2 is a side elevational view taken in the direction of the arrow 2 in FIG. 1.

FIG. 3 is a fragmentary sectional view on an enlarged scale taken along the line 3—3 in FIG. 1.

FIG. 4 is a fragmentary sectional view on an enlarged scale taken along the line 4—4 in FIG. 1.

FIG. 5 is a fragmentary side elevational view taken in the direction of the arrow 5 in FIG. 4.

FIG. 6 is a diagrammatic representation of the vertical slide construction shown in FIGS. 1, 4 and 5.

FIG. 7 is a sectional view taken along the line 7—7 in FIG. 6.

FIG. 8 is a diagrammatic view of a modified form of slide.

FIG. 9 is an end view of the slide shown in FIG. 8.

FIG. 10 is a diagrammatic side elevation of a further modified form of slide.

FIG. 11 is an end view of a slide shown in FIG. 10.

FIG. 12 is a diagrammatic end view of the horizontal slide shown in FIGS. 1–3.

FIG. 13 is a diagrammatic end view of a further modified form of slide.

FIG. 14 is a diagrammatic end view of a still further modified form of slide.

Referring to FIG. 1, the apparatus shown comprises a base 20 on which a horizontal slide 21 is mounted for horizontal movement in a straight line. In turn, a frame 22 is mounted on the horizontal slide 21 so that the slide 21 forms a base for the frame. The frame 22 supports vertically extending shafts 23 on which a vertical slide 24 is mounted, as presently described.

As shown in FIG. 1, base 20 includes a central cutaway portion 25 defining vertical supports 26, 27' on which longitudinally extending ways or guides 27, 28 are mounted. The upper and lower surfaces of guides 27, 28 are accurately formed and parallel. The horizontal upper surfaces of supports 26, 27' are also accurately formed. The slide 21 is, in turn, formed by an upper plate 29 that has an accurately formed lower surface and longitudinal end surface. A side block 30 is bolted along said one longitudinal edge of the plate 29 and projects downwardly. The contacting surface of side block 30 is accurately formed to provide a vertical surface 31 which is complementary to an accurately formed vertical surface 32 on longitudinal guide 28. Similarly, longitudinally extending blocks 33, 34, having accurately formed parallel surfaces, are bolted to the underside of plate 29 to define a re-entrant portion into which the guide 28 extends. Specifically, block 33 includes an accurately formed vertical surface 35 complementary to an accurately formed vertical surface 36 on the guide 28 and block 34 includes an accurately formed horizontal surface 37 complementary to an accurately formed horizontal surface 38 on the underside of guide 28.

A similar set of longitudinal blocks 39, 40, having accurately formed parallel surfaces, are provided on the underside of plate 29 to provide a re-entrant portion into which guide 27 extends. Block 39 includes a vertical surface 41 complementary to vertical surface 42 on guide 27 and block 40 includes a horizontal surface 43 complementary to horizontal surface 44 on the underside of guide 27.

By this arrangement, the accurately formed underside of the plate 29 represented by reference numerals 45, 46 is positioned adjacent complementary accurately formed surfaces 47, 48 on the guides 27, 28.

According to the invention, a plurality of spaced pressure pads are provided at longitudianlly spaced points on the surfaces of the slide and provide a thin film of viscous liquid between the surfaces of the slide and the base which holds the slide out of metal-to-metal contact with the base at all times, both when it is stationary and moving.

Specifically, as shown in FIGS. 1 and 2, a plurality of longitudinally spaced elongated pressure pads 50 are provided in the horizontal surface 46 on the underside of the upper plate 29 of the slide 21. Openings 51 extend from the upper side of the slide 21 to each pressure pad and an orifice unit 52 is provided in each opening 51. Each orifice unit 52 includes a capillary tube which meters the viscous liquid to the pressure pad 50 at a predetermined pressure. In addition, each orifice unit 52 includes a gauge 53. Such orifice units are disclosed and claimed in my copending application Serial No. 173,532, filed February 15, 1962, titled Machine Tool Spindle.

In addition, as shown in FIGS. 1 and 2, the horizontal surface 37 on the upper side of block 34 of the slide 21 is also formed with a series of longitudinally extending pressure pads 55. The pads 55 cooperate with the pads 50 as presently described to balance the vertical forces on the slide.

In order to balance the slide laterally and stabilize it laterally at all times, the vertical surfaces 31, 35 of the slide 21 are also formed with longitudinally spaced pressure pads 56, 57, respectively. Because of the location of pads 55, 56, 57, orifice units such as units 52 cannot be used in association with the pads 55, 56 and 57 and, instead, capillaries in the form of capillary tubes soldered in Allen head screws 59 are provided adjacent a passage extending to each orifice. Fluid under pressure is supplied to a main opening 60 in the plate 29 and branch passages 61, 62 extend from the main passage 60. Branch 62 supplies liquid under pressure to the capillaries 59 supplying pads 55, 57 and branch 61 supplies liquid under pressure to the capillaries 59 supplying pads 56.

The pads 56, 57 serve to stabilize the slide laterally as presently described. Pads 65, 64 corresponding to pads 50 and 55 are also provided on the surfaces 45, 43 on the other side of the slide 21. No pads are provided on the vertical surface 41 since lateral stabilization is achieved entirely by pads 56, 57.

Each capillary tube supplies liquid continuously at predetermined pressure to each pressure pad. The liquid flows in a substantially laminar fashion continuously in a thin low velocity film between adjacent surfaces of the slide and base preferably in such a manner that the liquid dissipates its pressure by the time it reaches the edges of the surfaces. The liquid is then collected and reused. Specifically, as shown in FIG. 1, the liquid flowing outwardly from pad 65 is collected in longitudinal groove 66 and passes through a drain passage 67 to the cutout portion 25 of the base. The liquid passing inwardly from pad 65 is collected in the space between surfaces 41, 42 and passes through drain openings 68 to the space 25. The liquid passing outwardly from pad 64 drains vertically to the space 25 and the liquid passing inwardly from pads 64 drain through drain openings 68 to the space 25. Liquid passing outwardly from pads 50 drains through longitudinally chamfered area 50a to the ends of the slide 21 and thereafter to collecting channel 70 and drain openings 71 to space 25. Liquid passing inwardly from pads 50 collects in chamfered area 50b and flows longitudinally to the ends of the slide 21 and thereafter through drain openings 72 to space 25. Liquid passing downwardly from pads 57 passes through drain openings 72 to the space 25. Liquid passing outwardly from pads 55 passes vertically to the space 25. Liquid passing inwardly from pads 55 flows through a chamfered area to drain openings 72 in the space 25.

The number and size of the pressure pads is such as to support the load on the slide 21 because of the weight of the slide and any other members on the slide and will vary depending upon the load. A minimum of two pads longitudinally spaced on the surfaces is required. The pressure pads are preferably so located relative to the adjacent surfaces that the liquid has substantially an equal distance to flow from the pad to the collecting area where it enters the drain passage.

The manner in which the slide 21 operates with respect to the base 20 can be more readily understood by reference to FIG. 12 which is a diagrammatic showing of the pressure pad. It can be understood that the pressure pads are at longitudinally spaced points. In the event that the pressure in the pads $P_1$ due to a load on the slide increases, the pressure in the pad also increases because of the restricting action and the pressure in the opposed pads $P_2$ decreases because of the unrestricting action so that a force is applied to the slide 21 tending to lift the slide and return the slide to its original position. The relative movements herein described are very slight because the surfaces are so designed with respect to the loads encountered and the clearances are so small that there is such a slight movement that it cannot be measured.

In the event that there is a lateral load to the left, as shown in FIG. 12, the pressure in the pads represented by the arrow $P_3$ will increase because of the restricting action and the pressure in the opposed pads represented by the arrow $P_4$ will decrease because of the unrestricting action so that a force is applied on the slide to the right tending to return the slide to its lateral position relative to the base 20.

Referring to FIG. 1, slide 24 which is movable on vertical shafts 23 comprises a plate 80 and two pairs of stanchions 81 which have openings through which the shafts 23 extend, a pair of stanchions 81 being provided for each shaft.

As shown in FIGS. 4 and 5, each stanchion 81 includes a cylindrical opening 82 through which the cylindrical shaft 23 extends. The surface of the cylindrical opening 82 is provided with a set of circumferentially spaced pressure pads 83 to which liquid under predetermined pressure is provided. The relative dimensions between the outer surface of the shaft 23 and the surface of the cylindrical opening 82 is such that a thin film of liquid flows at low velocity from the pressure pad through the surfaces. As shown in FIG. 5, an orifice in the form of a capillary tube 84 fixed in a screw 85 is provided in association with each pad in a passage 86 extending to the path. Liquid under pressure is provided to each orifice unit through respective inlets 87. Passages 88 extend from adjacent the outlet of each capillary tube to a peripheral opening 89 to which a gauge 90 is attached for indicating the pressure in each pad. The liquid passes from the pads 83 outwardly to annular drains 91, 92 from which the liquid is collected through external drains to the reservoir.

The manner in which the slide 24 is supported in a stable position relative to the frame 22 can be more readily understood by the diagrammatic showing in FIGS. 6 and 7. In the event that a lateral force is provided on the slide 24 in the direction such that the pressure in the pads represented by the arrows $P_5$ increases because of the restricting action, the pressure in the opposed pads $P_6$ decreases because of the unrestricting action so that a force is applied to the slide upwardly tending to move the slide back to its original position. Similarly, if a force is applied in such a manner that the pressure in the pads represented by the arrow $P_7$ increases because of the restricting action, the pressure in the opposed pads $P_8$ decreases tending to provide a force upwardly and to the right as shown in FIG. 7 and return the slide to its original position.

In the form of the invention shown diagrammatically in FIGS. 8 and 9, the pressure pads are again formed on the slide 100 which includes laterally extending portions 101 and reentrant portions 102 on the base into which the laterally extending portions 101 extend. Complementary horizontal surfaces are provided which stabilize the slide against upward movement as shown in FIGS. 8 and 9 and vertical surfaces are provided which stabilize the slide laterally with reference to FIGS. 8 and 9.

In the form of the invention shown diagrammatically in FIGS. 10 and 11, the slide 110 is provided with dovetail 111 along each edge thereof which extend into angular re-entrant portions 112 on the base. The pressure pads are provided on the inclined and horizontal surfaces of the slide 110 and are so positioned and sized that the pressure forces provided by the pressure pads tend to balance the forces on the slide and maintain the slide in a stable relationship with respect to the base.

In the form of the invention shown in FIG. 13, the slide 120 is provided with a rectangular opening 121 on the inner surface of which the pads are provided. In this form of the invention, only one shaft 122 is required to provide rotational stability as contrasted to the two cylindrical shafts shown in FIGS. 6 and 7.

In the form of the invention shown diagrammatically in FIG. 14, the lateral stabilization is achieved by pressure pads on opposed surfaces on opposite sides of the base.

The provision of the low velocity laminar flow of liquid between the surfaces of the slide and base effectively eliminates any friction because there is no metal-to-metal contact and provides a slide that will compensate for loads that are inadvertently applied thereon to thereby maintain a stable accurate axis of movement of the slide relative to the base. A gauge is provided in connection with each capillary tube so that a visual indication may be made at all times of the pressure in the pad. If a capillary should become clogged, the pressure will immediately drop to zero. The capillary can then be readily removed and cleaned. The gauges also assist in checking the pressures in the pads during manufacture of the slide. If the pressures in the pads of any opposed sets of pads are not equal, then the size of the capillaries can be changed to make certain that the pressures in the pads in that set are balanced. By varying the size of the hole or the length or both of the capillary tube, changes in the amount of liquid that passes through the tube with the resultant change of pressure in the pressure pad occurs.

The relative dimensions of the slide and base are such that the space between complementary surfaces, namely 45, 47 and 46, 48 and 43, 44, and 35, 36, and 31, 32, and 37, 38, and 23 and 82, range between two-thousandths (0.002) of an inch and one ten-thousandth (0.0001) of an inch and preferably between one-thousandth (0.001) of an inch and one-ten-thousandth (0.001) of an inch. Where the large size of the slide does not permit making surfaces within such close machining tolerances, because of machining limitations, the surfaces are made as accurately as possible provided that at least some portions of the surfaces provide a space which is within the above limits.

The arrangement not only compensates for varying forces on the slide but, in addition, compensates for varying forces because of change in position of the slide, that is, from a horizontal to a vertical or other position. Moreover, the fully compensated flow accommodates for minor surface or machining inaccuracies which inherently occur in commercial machining practices thereby producing an ultra-precise stable, smooth, vibration-free, friction-free support of the slide on the base.

The slide embodying the invention provides a very accurate control of the axis of movement of the slide with no wear so that the accuracy will be maintained indefinitely. The load-carrying characteristics include a resistance to shock which permits use of a slide for both finish and rough machining work so that one slide can be used for various purposes heretofore necessitating different slides.

Since there is no metal-to-metal contact, the parts can be made of a softer material to take advantage of the low coefficient of heat expansion of softer materials such as Invar.

I claim:
1. In a precision slide, the combination comprising
    a base having a pair of shafts suported thereon,
    each said shaft having a portion thereof of substantially constant cross section,
    a slide having a pair of openings therethrough through which said portions of said shafts extend,
    said openings in said slide and said portions of said shafts having complementary surfaces,
    said surface of each said opening having at least one set of circumferentially spaced pressure pads therein,
    an orifice associated with each said pressure pad,
    the relative dimensions of said base and slide being such that a pressurized film of liquid flows continuously between the surfaces through the pressure pads so that forces on the slide are balanced by pressure in the pads providing a permanent, stable, frictionless separation of the surfaces throughout the movement of the slide longitudinally on the base.

2. The combination set forth in claim 1 wherein said complementary surfaces of said slide and shafts are cylindrical.

3. The combination set forth in claim 1 wherein said complementary surfaces of said slide and shafts are non-circular in cross section.

4. The combination set forth in claim 1 wherein the relative dimensions of said base and slide define a space having at least some portions thereof ranging between two-thousandths (0.002) of an inch and one ten-thousandth (0.0001) of an inch.

References Cited by the Examiner

UNITED STATES PATENTS

| 1,668,976 | 5/1928 | Peet et al. | 308—5 |
|---|---|---|---|
| 1,785,688 | 12/1930 | Aldrich | 308—5 |
| 1,981,992 | 11/1934 | Curtis | 308—3 |
| 2,340,450 | 2/1944 | Bousehor. | |
| 2,998,999 | 9/1961 | Morser et al. | 308—122 |

FOREIGN PATENTS

| 886,796 | 7/1943 | France. |
|---|---|---|
| 1,142,912 | 4/1957 | France. |
| 876,171 | 8/1961 | Great Britain. |

DON A. WAITE, *Primary Examiner.*

FRANK R. SUSKO, ROBERT C. RIORDON, *Examiners.*